Sept. 22, 1942.                M. G. CROSBY                2,296,630
                     WAVE CONTROL AND CONTROL CIRCUITS
                     Original Filed May 25, 1938    3 Sheets-Sheet 1
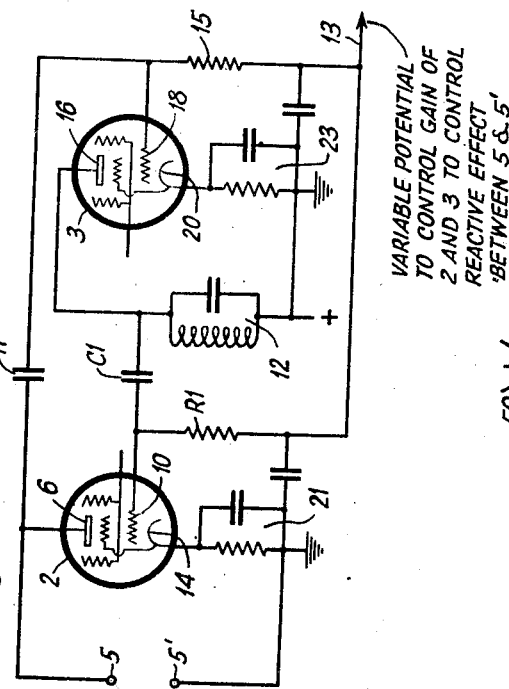
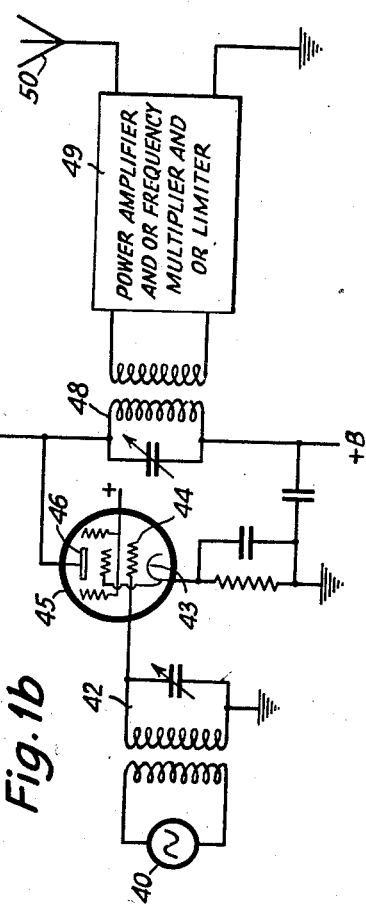
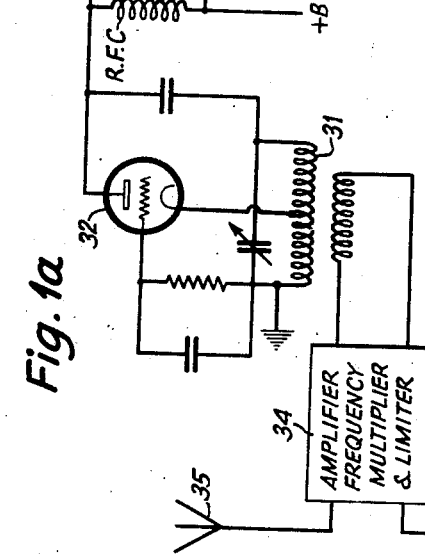
INVENTOR
MURRAY G. CROSBY
BY H.S. Grover
ATTORNEY Sept. 22, 1942.   M. G. CROSBY   2,296,630
WAVE CONTROL AND CONTROL CIRCUITS
Original Filed May 25, 1938   3 Sheets-Sheet 2

INVENTOR
MURRAY G. CROSBY
BY
ATTORNEY

Sept. 22, 1942.          M. G. CROSBY                2,296,630
                WAVE CONTROL AND CONTROL CIRCUITS
              Original Filed May 25, 1938    3 Sheets-Sheet 3
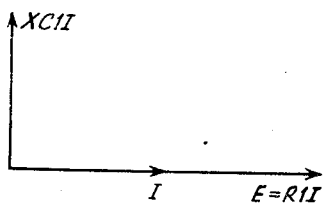
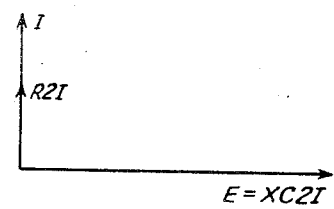
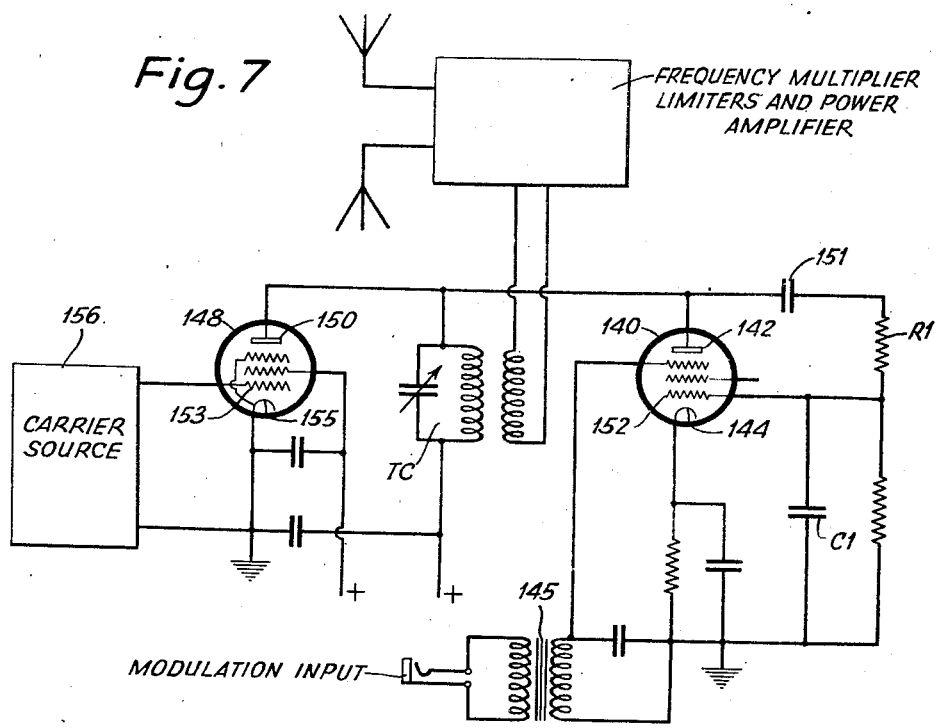
INVENTOR
MURRAY G. CROSBY
BY
ATTORNEY Patented Sept. 22, 1942

2,296,630

UNITED STATES PATENT OFFICE 2,296,630

WAVE CONTROL AND CONTROL CIRCUITS

Murray G. Crosby, Riverhead, N. Y., assignor to Radio Corporation of America, a corporation of Delaware Original application May 25, 1938, Serial No. 209,919, now Patent No. 2,250,095, dated July 22, 1941. Divided and this application June 19, 1941, Serial No. 398,727

5 Claims. (Cl. 179—171.5)

This is a division of my application Serial No. 209,919, filed May 25, 1938, now U. S. Patent No. 2,250,095, dated July 22, 1941. This application concerns a new and improved voltage control means of the reactance tube type and the application of the same to new and improved signalling circuits such as frequency and phase modulators. The novel reactance tubes are in accordance with my invention used to vary the tuning of any circuit such as, for example, an oscillator or amplifier tuned circuit. In my invention I apply the principles of push-pull and cascade amplification to reactance tubes known in the art so as to provide greater and more linear degrees of reactance variation.

Reactance tubes as referred to above have been disclosed in Travis' United States applications Serial No. 4,793, filed February 4, 1935, and Serial No. 19,563, filed May 3, 1935. Improvements on the reactance tube referred to in general above have also been disclosed in my United States applications Serial No. 165,056, filed September 22, 1937, now Patent No. 2,156,374, dated May 2, 1939, and Serial No. 167,344, filed October 5, 1937, now Patent No. 2,156,375, dated May 2, 1939.

In describing my invention reference will be made to the attached drawings wherein:

Figure 1 illustrates a novel reactance tube system including means for amplifying one of the voltages supplied in phase quadrature to the reactance tube electrodes to thereby increase the reactive effect of the tube. The phase displacing circuit for producing the substantially phase quadrature potentials used to obtain the reactive effect is placed in the coupling circuit between the reactance tube and the amplifying reactance tube. In this modification controlling voltages from any source are supplied to electrodes of the amplifying reactance tube and the reactance tube to thereby control through a greater range the reactive effects;

Figures 1a and 1b are diagrammatic showings of an oscillator and a wave amplifier which may be controlled by the reactive effect produced in the reactance circuit of Figure 1 to produce frequency and phase modulation respectively;

Figures 5 and 6 are vector diagrams used in explaining the circuits of Figures 3 and 4; while Figure 7 is a phase modulator circuit utilizing a reactance tube in a novel manner to control the phase of wave energy being amplified in accordance with signalling voltages.

Figure 2:
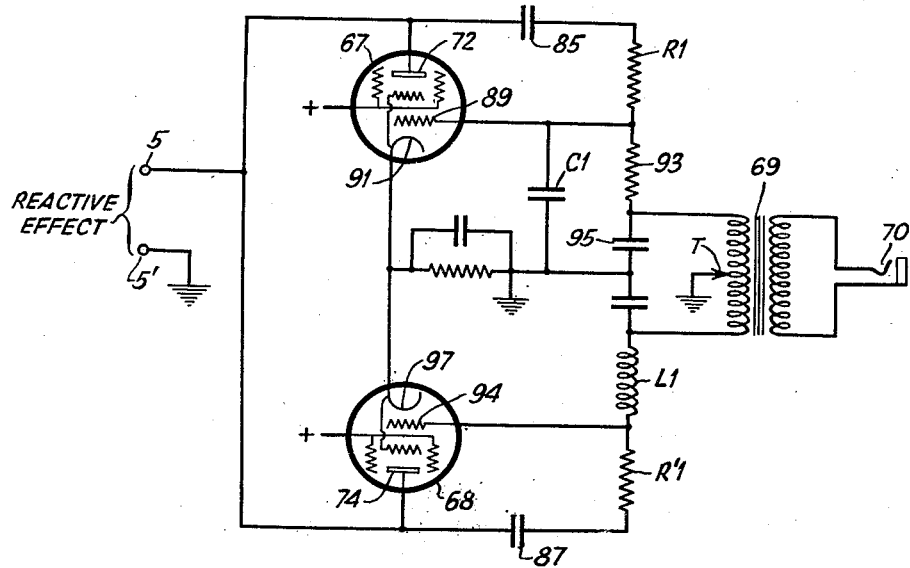
Figure 2 is a modified reactance circuit wherein a pair of reactance tubes have their electrodes supplied with controlling potentials in push-pull and their output electrodes in parallel to thereby increase the reactive effect and at the same time improve the linearity of said effects with respect to the controlling potentials.

In the circuit of Figure 1 cascade amplification is utilized to amplify the phase shifted substantially phase quadrature feedback voltage of the reactance tube. Ordinarily the plate alternating voltage of the reactance tube is fed back to the grid by means of a phase shifter which imparts a 90 degree phase shift to the voltage. In this known system, however, the voltages fed back are not amplified. Such a system would be as if the tube 3 of Figure 1 was omitted and the phase quadrature voltages supplied from the anode 6 of tube 2 directly to the phase shifting circuit C1R1 and from the adjacent terminals of C1R1 directly to the grid 10 of tube 2. Under these circumstances, assume that voltage from any circuit to be controlled is supplied to the terminal of lead 5 and from lead 5 to the anode 6 of tube 2 and from anode 6 to the right-hand terminal of C1 (tube 18, circuit 12, and condenser 11 omitted). The value of resistance R1 is made small as compared to the reactance of the condenser C1 so that the current through the circuit is largely reactive and leads the voltage by about 90 degrees. Since the voltage drop through R1 is in phase with the current the phase quadrature relation between the radio frequency potentials on 6 and 10 necessary for the reactive effect is obtained. The tube reactance, that is, the reactance between electrodes 6 and 14 of tube 2 connected to any radio frequency circuit may be utilized to control the reactance of the said circuit. This reactive effect which may be considered inductive or capacitive is in turn controlled by the potentials supplied to the controlling potential lead 13 and from lead 13 to control grid 10.

In my improved circuit I amplify one of the voltages supplied substantially in phase quadrature from anode 6 to control electrode 10.

In the circuit of Figure 1 the alternating current voltage supplied from the circuit, the reactance of which is to be controlled is supplied to anode 6 from lead 5 and to coupling condenser 11 and from condenser 11 to the control grid electrode 18 of an electron discharge tube 3, amplified in said tube 3 and supplied from the anode 16 thereof of tuned circuit 12 and fed from the high voltage end of tuned circuit 12 to the phase shifting and coupling condenser C1 and from the latter condenser to the control grid 10 of reactance tube 2.

The cathodes 14 and 20 of tubes 2 and 3 are connected to ground by bias resistor and bypass condenser units 21 and 23 respectively. Grid bias resistor R1 serves also as a phase shifting resistance. Operating potentials are supplied to the tube electrodes as desired in the usual fashion from sources of potential not shown.

R1C1 constitutes the phase shifting circuit which shifts the phase of the amplified alternating voltage supplied from the anode 16 of tube 3 and applies it to the grid 10 of amplifier tube 2. This phase shifting circuit may be replaced by a tuned transformer or any other phase shifting circuit. Grid leak 15 and resistor R1 are used to apply voltage from lead 13 connected with any control voltage source to the control grids 10, 18 of tubes 2 and 3, respectively, to thereby vary the overall gain of both of these tubes and consequently vary the effective reactance at the plate 6 of tube 2. When controlling potentials such as modulating potentials are applied to the lead 13 they produce reactive effects which are supplied between 5 and ground or cathode 14.

This reactive effect may be utilized as illustrated in Figure 1a to frequency modulate an oscillator. For example, by connecting lead 5 to lead 29 this effect may be used to control the reactance of a tuned circuit 31 of an oscillator system including tube 32 to thereby frequency modulate at signal frequency the oscillations produced in the tube and system and supplied from 31 to a radio frequency amplifier, frequency multiplier, etc., in 34. Frequency modulated energy from 34 may be supplied to any load such as, for example, an aerial 35.

Moreover, the reactive effect produced as described above between anode 6 and cathode 14 may be applied to an arrangement such as shown in Figure 1b to produce phase modulated oscillations. In Figure 1b wave energy from any source 40 is supplied to tuned circuit 42 and from circuit 42 to the control grid 44 of an electron discharge tube 45 and from the amplified energy is supplied from the anode 46 of 45 by way of tuned circuit 48 to a power amplifier and/or frequency multiplier and/or limiter 49 and from 49 to any load circuit such as for example, an aerial 50. Now, if we connect the anode 46 as to the lead 47 and connect the said lead 47 to the lead 5 and to the high voltage end of tuned circuit 48 and complete the reactance circuit by connecting the cathode 14 of tube 2 to the cathode 43 of tube 45, the reactive effects are applied to the tuned circuit 48 of the electron discharge device 45. The reactive effects modify the reactance of circuit 48 and thereby vary the phase of the wave energy supplied by tube 45 to unit 49 in accordance with the controlling potentials supplied to lead 13. These controlling potentials may represent signals.

The circuit of Figure 1 has for a primary advantage the fact that the over-all again of the reactance tube 2 is increased due to the cascade amplification supplied by tubes 2 and 3 operating together. Since the amount of variable reactance obtainable from a reactance tube is dependent upon the gain or amplification of that tube, an increase of that gain will increase the amount of variable reactance available. A further advantage of this type of reactance tube circuit lies in the fact that the phase shifting circuit R1C1 may be made such as to very lightly load the tuned circuit which is being controlled. For example, if the reactance tube circuit of Figure 1 is connected at 5 to lead 29 of Figure 1a, the reactance tube circuit places a light load on the oscillator circuit, including tube 32 and tuned circuit 31 and therefore operating difficulties such as maintenance of substantially constant mean oscillating frequency, etc., are materially reduced. With a single reactance tube as known in the prior art in order to produce high degrees of reactive variation, resistance R1 must be lowered to values which appreciably load the controlled or modulated tuned circuit such as, for example, the tuned circuits 31 of Figure 1a and 48 of Figure 1b.

In my novel cascaded amplification reactance system, the effective loading produced by the reactance tube may be made very light so that the variable reactance will have a high effective circuit Q. Hence, for phase modulation purposes as illustrated in Figures 1 and 1b less reactive variation will be required to produce a given amount of phase modulation than would be required if the Q of the reactance tube were lower. Modulations or controlling potentials are applied to the control grids of either one of the tubes 2 and 3, singly if desired or as shown to both of these tubes or the modulating or controlling potentials from 13 may be applied to other electrodes of one or both of the tubes 2 and 3.

Obviously, my novel reactance circuit is particularly applicable to variable tuning systems wherein the frequency of a receiver is automatically controlled in accordance with controlling potentials obtained in frequency discriminating circuits or otherwise. In this case, terminal 5 of the reactance tube system of Figure 1 is connected to the tuned circuit of the receiver heterodyne oscillator and as before, the automatic frequency control potentials are applied to the lead 13. More details as to the application of a reactance tube of any type and in particular of the reactance tube of the present invention to automatic frequency control systems have been described in detail in my United States applications Serial No. 16,591, filed April 16, 1935, now Patent No. 2,123,716, dated July 12, 1938, and Serial No. 171,820, filed October 30, 1937, now Patent No. 2,163,747, dated June 27, 1939, and in my United States Patent No. 2,065,565, dated December 29, 1936; No. 2,042,831, dated June 2, 1936, No. 2,076,175, dated April 6, 1937, and No. 2,085,008, dated June 29, 1937.

In the novel circuit of Figure 2, I apply the principles of push-pull to the reactance tubes 67, 68 for the purpose of producing large reactive effects which more linearly follow the controlling potentials supplied from any source to a jack 70 and a transformer 69. In this arrangement the lead 5 is again adapted to be connected to any tuning circuit, the frequency of which is to be controlled, and voltages from which are supplied to the anodes 72, 74 of tubes 67, 68, respectively. These voltages are also supplied to coupling condensers 85, 87 and from said coupling condensers to phase shifting resistances R1R'1 respectively. The voltage from R1 is impressed on the control grid 89 of tube 67 and this phase shifting circuit is completed by connecting a capacitive reactance C1 to the cathode 91 of tube 67. The controlling potential circuit to grid 89 is completed through a resistor 93 connected to one end of the secondary winding of transformer 69. Resistance 93 also completes the direct current circuit between the cathode 91 and controlling electrode 89 of tube 67 since the electrical center of the secondary winding of 69 is connected to said cathode 91. The voltages supplied by 87 to R'1 are supplied therefrom to the control electrode 94 of tube 68 and the phase shifting circuit is completed by an inductive reactance L1 connecting control grid 94 through one of a pair of by-passing condensers 95 to the cathode 97 of tube 68. It is noted that the inductance L1 also has a double purpose since it completes the direct current circuit between the control grid 94 and cathode 97.

Tube 67 has its plate voltage fed back to its grid by means of a phase shifting circuit R1C1 and coupling condenser 85, while tube 68 has its feed-back voltage applied to its grid by means of phase shifting circuits R'1L1 and coupling condenser 87. By virtue of the fact that one of the tubes obtains its feedback voltage from a capacitive reactance drop and the other obtains its feedback voltage from an inductive reactive drop, the effective reactance variable at the plate circuits of the two tubes will be opposite for equidirectional element voltage variations. As will be noted, the controlling or modulating potentials are supplied by means of a push-pull transformer to the controlling electrodes 89 and 94 so that the tubes are controlled or modulated in phase displaced relation with respect to each other.

When the potential supplied to the control grid 89 goes up the capacity reactance effect is increased so that the reactive effect of tube 67 is increased. Simultaneously, the control potential supplied to the grid 94 goes down and this increases the inductive reactance of tube 94. In other words, the capacity and inductive effects of the tube 67 vary in phase as a consequence of the phase displaced control thereof.

The reactive effects are added in the outputs which are in parallel and may be supplied from the lead 5 to any circuit to be controlled. For instance, lead 5 may be connected to leads 29 or 47 of the modifications shown in Figures 1a and 1b to produce frequency or phase modulation, respectively, in the same manner as described in connection with Figures 1a and 1b.

The push-pull reactance tube circuit described above produces a larger and more linear reactance variation which will allow of a greater degree of control of the modulation of the potentials supplied to the reactance tube, for example, to the jack 70 and transformer 69 of Figure 2. Consequently, a greater and more faithful degree of frequency or phase modulation can be produced.

Obviously the tubes of Figure 2 which are in parallel as to the reactive effect may also be modulated or controlled in the same direction by the controlling or modulating potentials. Where the tubes are controlled differentially as in Figure 2 the amount of control or modulation of each tube may be adjusted by moving the taps T on the secondaries of transformers 69 and 127 off center. Then one tube is modulated over a greater range than the other. In this manner the linearity of the produced reactive effect may be improved in some cases.

Figure 3:
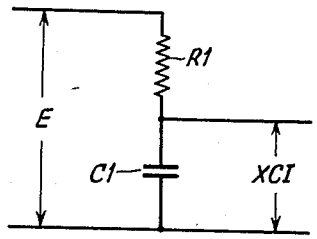
Figures 3 and 4 are phase shifting reactances utilized in explaining the manner in which the substantially phase quadrature voltages are obtained on the electrodes of the reactance tube.

In Figure 3, I have shown a phase shifting circuit such as, for example, used in Figure 2. Figure 5 is a vector diagram of the voltages obtained by this phase shifting circuit. In Figure 3, E is the applied voltage such as, for example, the voltage supplied from any tuned circuit to anode 72 and cathode 91 of tube 67 of Figure 2. XC1 is the reactance of C1 and is made low as compared to the resistance of R1 with respect to the frequency of the voltages involved so that the current through this circuit is largely resistive and is in phase with the voltage as shown by the arrowhead indicated by I in Figure 5. The reactance drop across condenser C1 will be 90 degrees out of phase with the current so that XCI1 is 90 degrees out of phase with E as shown.

Figure 4:
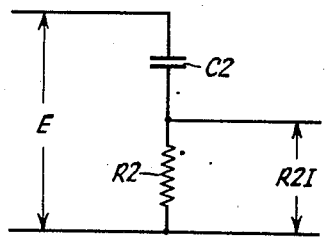

Figure 4 shows the phase shifted circuit for an arrangement such as shown at C1R1 in Figure 1; Figure 6 is the vector diagram illustrating the manner in which the phase shift is obtained in this latter circuit. The reactance of condenser C2 is made large as compared with the resistance of R2 with respect to the frequency of the voltages involved so that the current through this circuit is largely determined by the condenser. Since the current is capacitively reactive it leads the voltage E by 90 degrees as shown in Figure 6. The drop across R2 will be in phase with the current through this circuit. Consequently, the drop across R2 is 90 degrees out of phase with the voltage E and the required phase shift is effected.

Of course, I do not limit my invention to the use of reactance tubes including the reactance amplifying effect disclosed in this application. Obviously reactive circuits as illustrated in Figure 7 may be used to phase modulate wave energy within the spirit of my invention. In this circuit the reactance tube 140 has a grid electrode, that adjacent plate 142, and its cathode 144 connected to a source of controlling or modulating potentials 145. The reactance or output of the tube 140 is connected in shunt to the tuned circuit TC of a carrier wave amplifier 148. The anode 150 of this tube also is connected by a coupling condenser 151 and phase shifting resistance R1 and phase shifting condenser C1 to the control grid 152 and cathode 144. The reactive effects produced between the anode and cathode of tube 140 tune the circuit TC to modulate the phase of the wave energy supplied from the carrier wave source 156 to the control grid 153 and cathode 155 of amplifier tube 148. The phase modulated wave energy is supplied to any utilization circuit which may include frequency multipliers, limiters, etc., as shown.

I claim:

1. In a wave length modulation system, a tube reactance of the type wherein alternating current voltages to be modulated flowing in a tuned circuit are impressed substantially in phase quadrature upon two of the tube electrodes and its gain varied in accordance with signals to produce a variable reactive effect between the said tube electrodes to vary the reactance of said tuned circuit and thereby the wave length of said voltages, means for increasing said reactive effect and thereby improving said wave length modulation including an additional tube having input and output electrodes, means for impressing one of said voltages on the input electrodes of said additional tube for amplifying said one of said impressed voltages, and phase shifting means for impressing said amplified voltage on an electrode of said first tube substantially in phase quadrature with the voltage on the other electrode of said first tube.

2. In a phase modulation system, a tuned reactance coupling a source of substantially constant oscillating voltages to be phase modulated to a utilization circuit, a source of modulating potentials, an electron discharge device having electrodes including a cathode and a plurality of auxiliary electrodes, circuits including means for producing a phase shift in voltages of a frequency of the order of the frequency of said oscillating voltages to be modulated coupling said tuned circuit to a pair of auxiliary electrodes in said tube, said circuits serving to impress said voltages substantially in phase quarature on said auxiliary electrodes to produce in said tube a reactive effect reflected in said tuned circuit, means for amplifying one of said impressed voltages to increase said reactive effect, and means for varying said reactive effect in accordance with signals to thereby vary the phase of the voltages supplied to said utilization circuit by way of said tuned circuit in accordance with signals comprising means coupling said source of modulating potentials with the cathode and an auxiliary electrode of said tube.

3. In a system for modulating the length of high frequency wave energy set up in a high frequency circuit comprising a reactance resonating substantially at the mean frequency of said wave energy, an electron discharge device having an anode, a cathode and a plurality of control grids, a coupling between the anode of said discharge device and a point on said reactance, a phase shifting circuit coupling the anode of said device to one of the control grids of said device, voltage amplifying means in said coupling, a connection between another point on said reactance and the cathode of said device, and means for setting up modulating potentials between another control electrode and the cathode of said device.

4. In a wave frequency control system, an electron discharge tube reactance of the type wherein alternating current voltages the wave length of which is to be controlled, flowing in a tuned circuit, are impressed substantially in phase quadrature upon two of the tube electrodes and the tube's gain varied by control potentials to produce a variable reactive effect between the electrodes of said tube to vary the reactance of the said tuned circuit and thereby the wave length of said voltages, means for increasing said reactive effect and thereby improving said wave length control including an additional tube having input and output electrodes, a coupling for impressing one of said voltages on the input electrodes of said additional tube for amplifying said one of said impressed voltages, and a coupling for impressing said amplified voltage on one of said two electrodes of said first tube.

5. In a wave length modulation system, a tube reactance of the type wherein alternating current voltages to be modulated, flowing in a tuned circuit, are impressed substantially in phase quadrature upon two of the tube electrodes and its gain varied in accordance with signals to produce a variable reactive effect between the said tube electrodes to vary the reactance of said tuned circuit and thereby the wave length of said voltages, means for increasing said reactive effect and thereby improving said wave length modulation including an additional tube having input and output electrodes, a coupling for impressing one of said voltages on the electrodes of said additional tube for amplifying said one of said impressed voltages, a coupling for impressing said amplified voltage on one of said two electrodes of said first tube, and a phase shifting network in one of said couplings for establishing said substantially phase quadrature relation between the amplified voltage and the other voltage on said two electrodes of said tube reactance.

MURRAY G. CROSBY.